(No Model.)
B. F. CHAPPELL.
CHUCK.
No. 313,472. Patented Mar. 10, 1885.
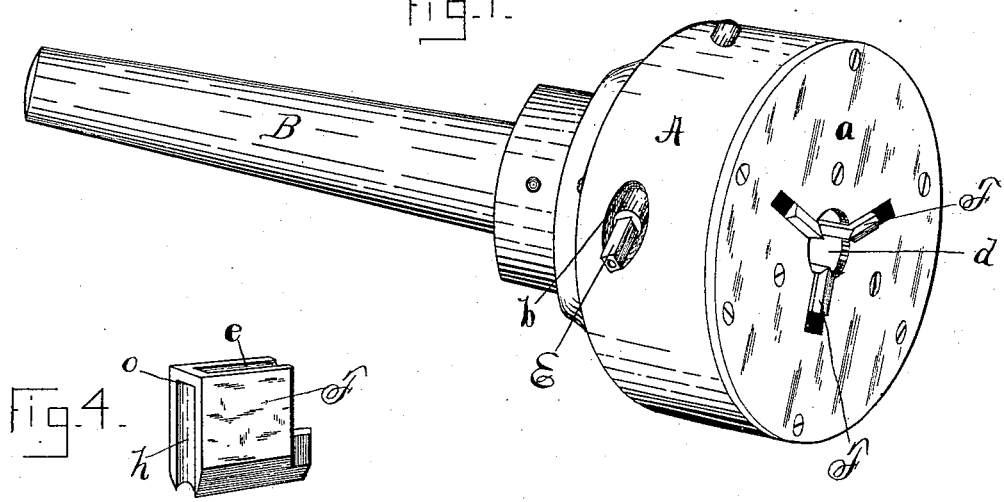
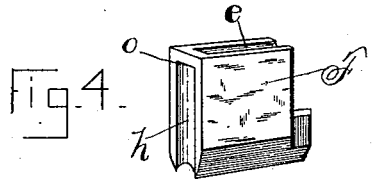
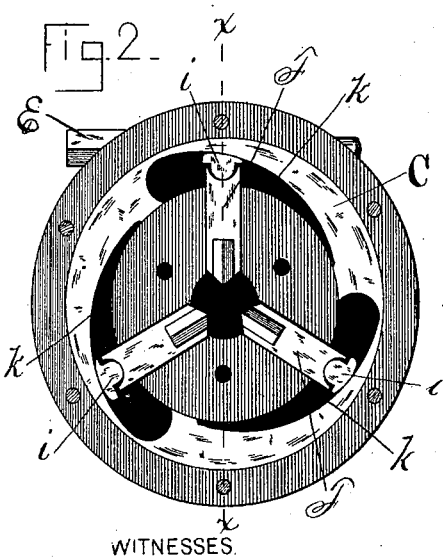
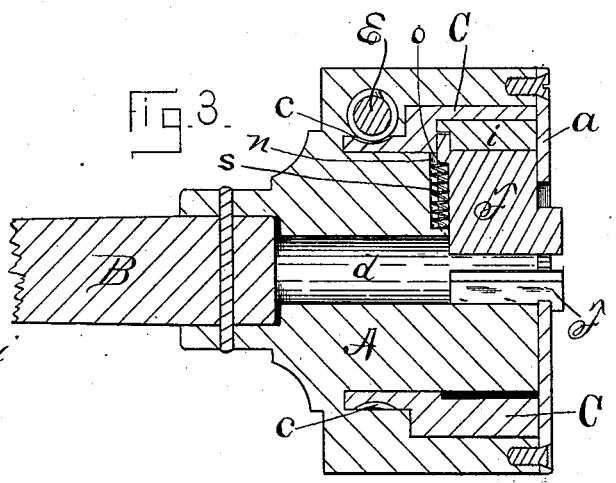
WITNESSES.
Frank H. Allen
Louise C. Braman
INVENTOR.
Benjamin F. Chappell.

UNITED STATES PATENT OFFICE.

BENJAMIN F. CHAPPELL, OF SOUTH WINDHAM, CONNECTICUT, ASSIGNOR OF ONE-HALF TO MARTIN CARD, OF SAME PLACE.

CHUCK.

SPECIFICATION forming part of Letters Patent No. 313,472, dated March 10, 1885.

Application filed June 19, 1884. (No model.)

*To all whom it may concern:*

Be it known that I, BENJAMIN F. CHAPPELL, of South Windham, Windham county, Connecticut, have invented a certain new and useful Improvement in Chucks, which improvement is fully set forth and described in the following specification, reference being had to the accompanying drawings.

My invention relates to that class of mechanical devices commonly known as "universal chucks" or "drill-chucks," in which drills or other tools, or work to be turned and finished may be securely held, my immediate object being to produce a chuck which shall be simple in construction, strong in its parts, positive in its action, and in which the drill or other article held cannot slip or work loose.

My invention consists, in brief, of the usual metallic case, in which are located a series of jaws, preferably three in number, said jaws being forced inward or toward the center by a series of internal cams or inclined surfaces on a collar located within the case of the chuck, rotary motion being imparted to said cam-collar by a worm and gear, as more fully described hereinafter.

In the accompanying drawings, Figure 1 is a perspective view of my chuck complete. Fig. 2 is a face or endwise view of the same with the plate *a* removed to show more clearly the relative arrangement of the internal mechanism. Fig. 3 is a longitudinal sectional view on line *x x*, Fig. 2. Fig 4 is a detached perspective view of one of the jaws of the chuck; and Fig. 5 shows side, end, and top views of a piece, *i*, which I use with each jaw to reduce the friction of parts somewhat and to prevent all tendency on the part of the jaws to stick or cramp as the cam-collar is rotated.

The letter A represents the case of my device, having a mandrel, B, to enter the hollow spindle in the head-block of the lathe; or, if preferred, the case A may be provided with an internal thread and screwed onto the lathe-spindle in place of the face-plate ordinarily used. The case A is provided, at a point about midway between its central hole and periphery, with a groove concentric with its periphery, and of width and depth sufficient to receive the cam-collar C, which collar extends well rearward, being reduced in diameter at its inner end and having formed on the periphery of said reduced portion gear-teeth, as shown at *c* in the sectional view, Fig. 3. Immediately over said gear-teeth, and in a direction transverse to the axial center of the chuck, the case A is drilled, as at *b*, to receive the screw or worm shaft E. When in place, the screw-threads on said shaft E engage the teeth on the cam-collar C, and as the screw-shaft is caused to rotate by a suitable wrench, it in turn causes the cam-collar to rotate in the case A. The center of the case A is drilled, as at *d*, to receive the drill or work to be held, and that portion of the case which remains between said center hole and the recess which is to receive the cam-collar is provided with radial grooves corresponding in size and number with the jaws.

In Fig. 4 I have shown the general form of jaw F, which I use, it being made, preferably, of hardened steel and provided with grooves, as at *e h*. In the groove *e*, on the outer edge of the jaw, I place the "anti-friction" piece *i*, before referred to. The lower semicircular portion of piece *i*, which rests in groove *e*, should be of such height that the piece *i* may have a considerable rocking motion as the cams act on the jaws. The outer face of piece *i*, which rests on the cam-collar C, should be shaped as an arc of a circle whose diameter is somewhat less than that of the cam which it engages. My chuck would work fairly well if the pieces *i* were dispensed with, allowing the cams to work directly on the jaws; but as a rule I prefer to use said pieces. The inner side of the collar C is cut away, leaving the series of cams or inclined surfaces *k*, one for each jaw. It will now be evident that if the several parts are properly fitted and assembled and the worm-shaft E rotated, the cam-collar C will slowly revolve, and, as the inclined surfaces *k* engage the pieces *i*, the jaws F will travel simultaneously toward the common center, grasping firmly whatever is placed between them.

It will be noticed that the action of my cam-collar is almost identical with that of a wedge driven in behind each piece *i*, forming a solid backing, which will not allow the jaws to work loose. By thus forming a series of cams on a single rotating collar, I am able to make a strong chuck with few working parts.

As a convenient means by which to automatically open the jaws as the cams are withdrawn, I have arranged in each jaw a spring, $s$, which is partially inclosed by the groove $h$ in the back side of the jaw, and partially by a semicircular groove, $n$, in the case A, one end of said spring being held by the case, the other end resting against the shoulder $o$ of the jaw with a constant tendency to move the jaw outward.

Having thus described my invention, I claim as new and wish to secure by Letters Patent—

1. In combination with the case A, grooved concentrically and slotted radially, as described, a series of jaws fitted movably in said radial slots, a rotatable collar, as at C, located within said concentric groove and provided with a series of internal cams, and the rocking pieces $i$, located between the jaws and cams $k$, as and for the purpose specified.

2. In combination with the case A, grooved concentrically and slotted radially, as described, the rotatable collar C, with cams $k$, a series of jaws fitted movably in said radial slots, the pieces $i$, intervening between the cams $k$ and the jaws of the chuck, means for rotating the cam-collar C, and the springs $s$, so located within the jaws and case A that they tend to force the jaws outward when the cams are withdrawn, substantially as and for the purpose specified.

BENJAMIN F. CHAPPELL.

Witnesses:
FRANK H. ALLEN,
LOUISE C. BRAMAN.